(No Model.) 4 Sheets—Sheet 1.
W. J. EDWARDS.
COMBINED SPEED INDICATOR AND CYCLOMETER.
No. 597,272. Patented Jan. 11, 1898.
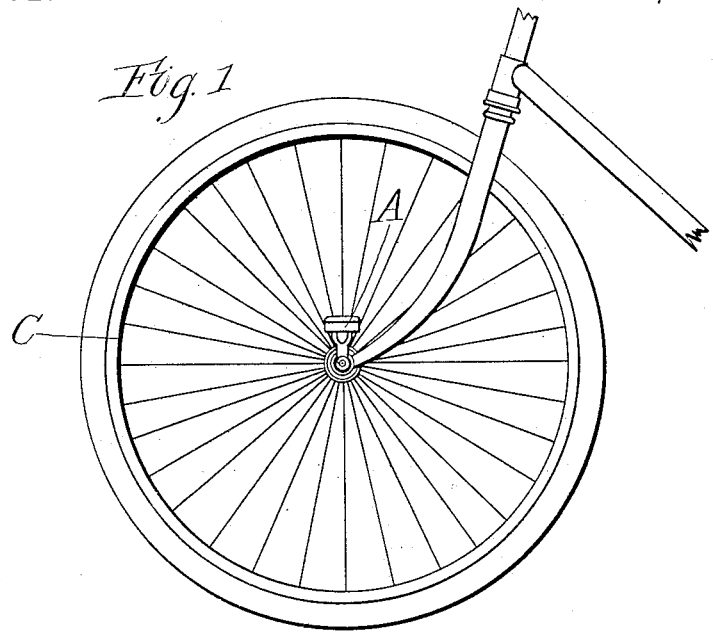
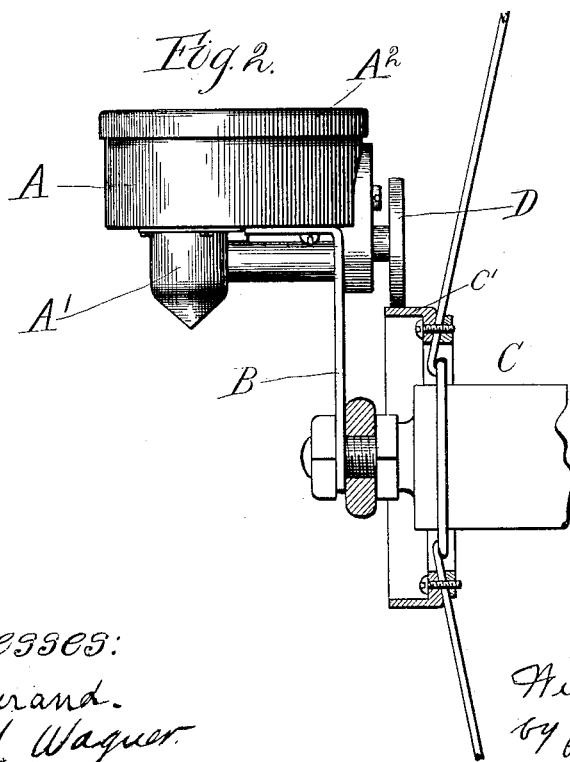
Witnesses:
A. F. Durand.
Peta M. Wagner.
Inventor:
William J. Edwards
by Page & Belfield
Attys.

(No Model.) 4 Sheets—Sheet 2.
W. J. EDWARDS.
COMBINED SPEED INDICATOR AND CYCLOMETER.
No. 597,272. Patented Jan. 11, 1898.
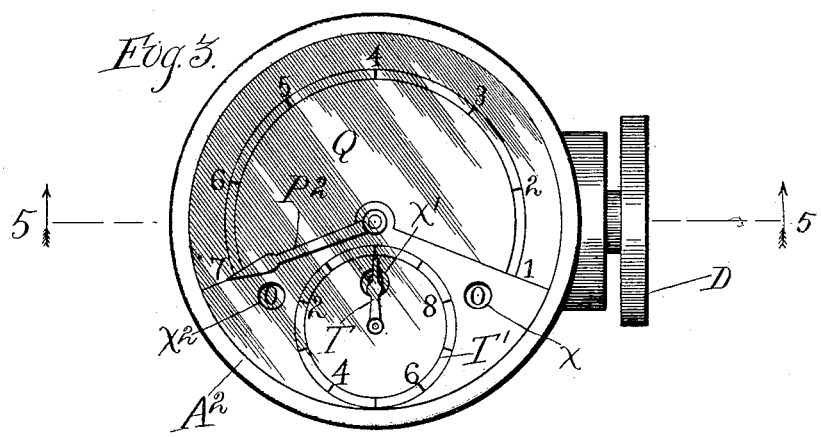
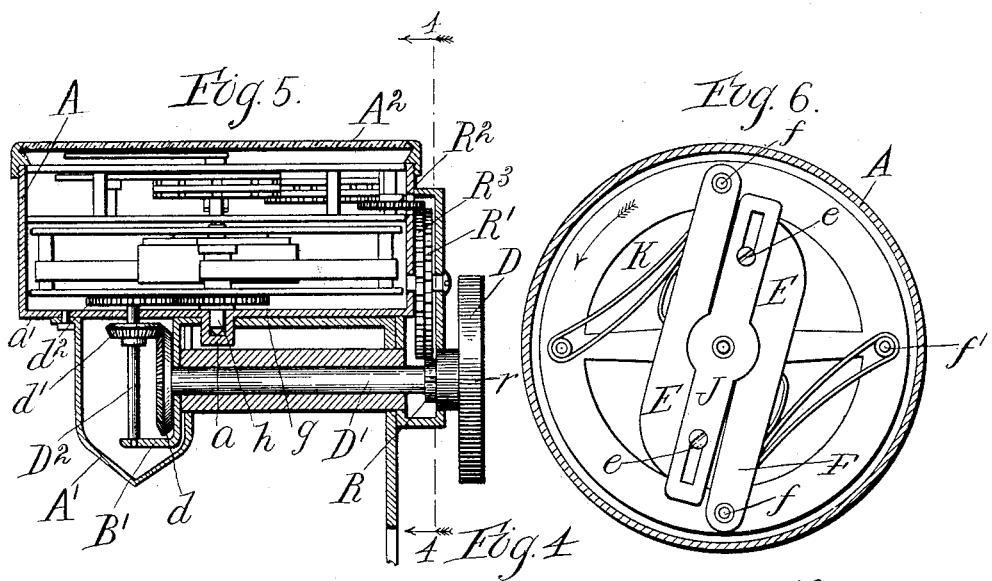
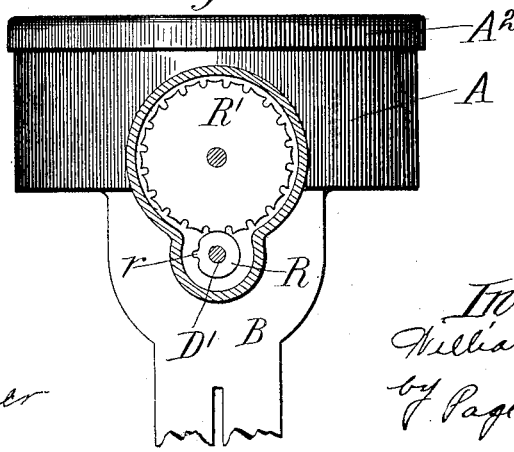
Witnesses:
A. F. Durand.
Reta M. Wagner.
Inventor:
William J. Edwards
by Page & Belfield
Attys

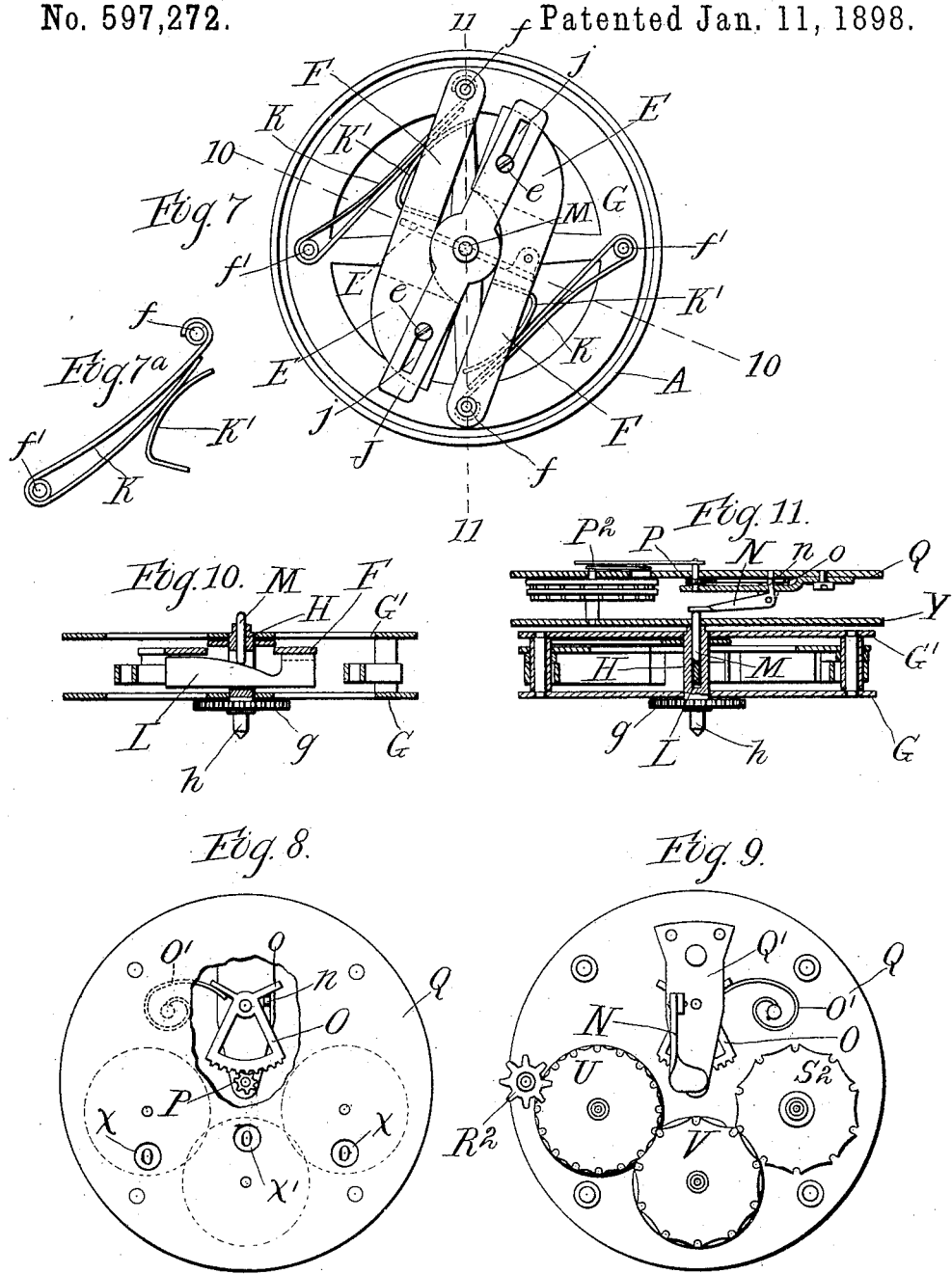

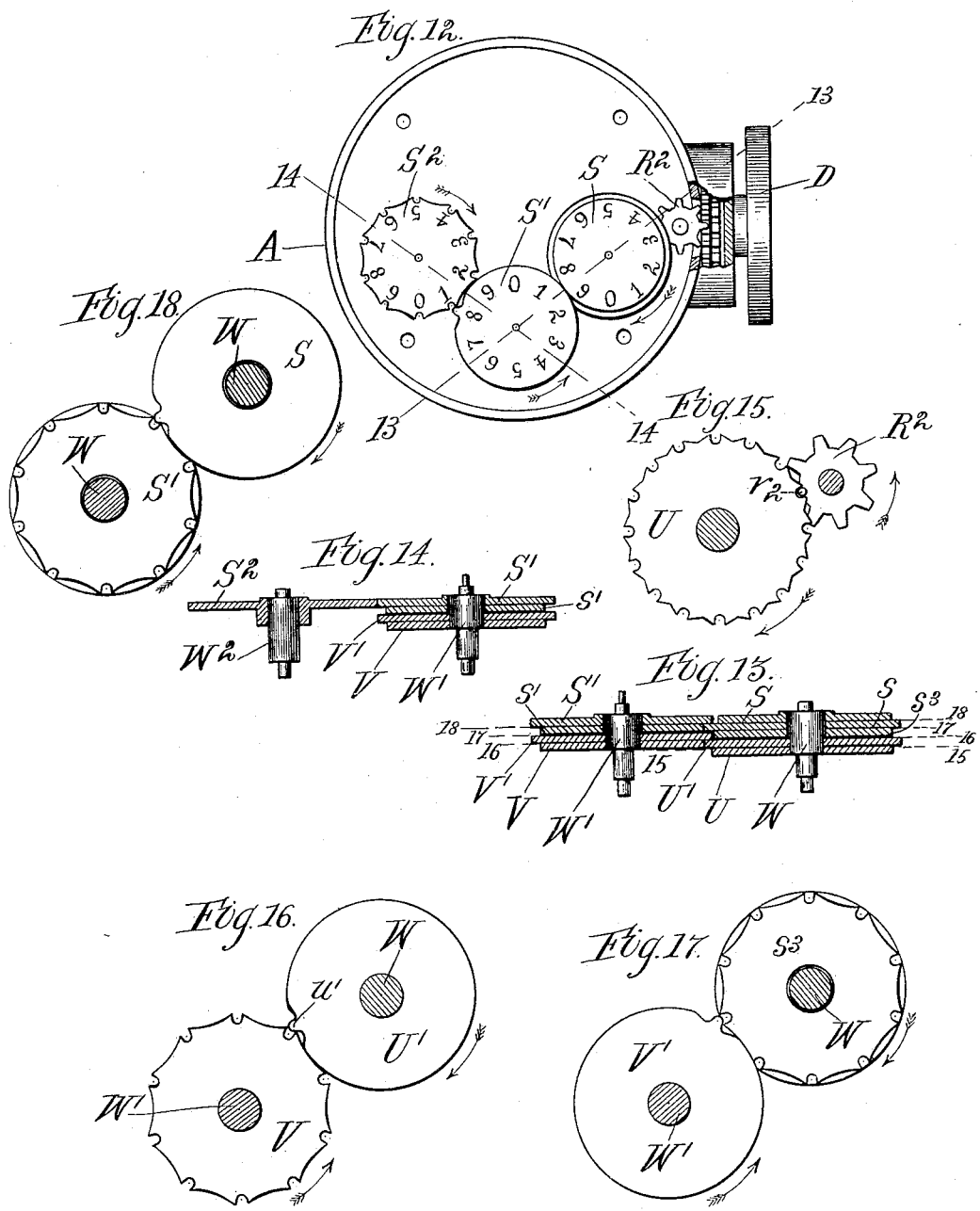

UNITED STATES PATENT OFFICE.

WILLIAM J. EDWARDS, OF CHICAGO, ILLINOIS.

COMBINED SPEED-INDICATOR AND CYCLOMETER.

SPECIFICATION forming part of Letters Patent No. 597,272, dated January 11, 1898.

Application filed July 6, 1896. Serial No. 598,168. (No model.)

*To all whom it may concern:*

Be it known that I, WILLIAM J. EDWARDS, a citizen of the United States, residing in Chicago, in the county of Cook and State of Illinois, have invented a certain new and useful Improvement in a Combined Speed-Indicator and Cyclometer, of which the following is a specification.

My invention relates to a device for indicating the rate of travel of a vehicle at any instant and also for registering the total distance passed over by the same during its journey.

My invention contemplates the provision of a centrifugal mechanism, comprising one or more weights supported for rotary motion and connected for movement toward and away from the center of rotation, and of a suitable indicator which shall show the extent of such movement on the part of the weight or weights. The rotary movement is to be communicated to the centrifugal mechanism from one of the revolving vehicle-wheels, the result of such arrangement evidently being that the weights are moved outward to a greater or less extent according to the rate of rotation of the vehicle-wheel. Considering, then, the distance traversed by a rotation of the vehicle-wheel, the movement of the weights may be properly utilized and caused to show upon a suitable indicator the rate of progression at the particular instant when the observation is taken.

In the device for carrying out my invention, more particularly described hereinafter, the weights are carried by swinging arms which are pivotally connected to a rotating support whereby the weights swing inwardly and outwardly in the plane of rotation. In such device also the indicator comprises a suitably-graduated dial and a hand or pointer arranged to swing over the same. This hand or pointer is caused to swing according to movement of the centrifugal weights by means of a wedge arranged to be moved longitudinally by the latter, suitable connection being provided to transmit the reciprocating movement imparted to a movable piece actuated by the inclined surface of the wedge to the hand or pointer and also to convert such reciprocating movement into motion available to deflect the hand or pointer.

Suitable cyclometer mechanism is also desirably provided whereby the total number of miles traveled may be registered.

To this end the invention contemplates arranging below the previously-mentioned dial a number of small dials provided with numerals, which appear through suitable apertures in the main dial. These small dials are provided with suitable rotative mechanism and connected with each other and with the main rotary wheel, which is driven by the vehicle-wheel.

As a convenient arrangement the centrifugal apparatus is arranged to rotate and swing in a plane parallel to the face of the device and is contained in a case capable of bodily removal from the main case of the device. The smaller dials and driving mechanism are also desirably inclosed in a removable case, the two subsidiary cases forming, when inclosed in the main containing-case, a neat, compact, and easily-accessible device for indicating both speed and distance.

In the accompanying drawings, Figure 1 is a view illustrating a device embodying my invention attached to a bicycle. Fig. 2 shows in front elevation, on a larger scale, the device thus attached to a bicycle-wheel, parts of the latter being in section. Fig. 3 is a top plan of the device on a still larger scale. Fig. 4 is a corresponding side elevation with a portion of the casing removed, as indicated by the line 4 4 in Fig. 5. Fig. 5 is a vertical section taken on line 5 5 in Fig. 3. Fig. 6 is a plan of the centrifugal mechanism, the containing-case of the device being shown in section. Fig. 7 is a similar top plan of the centrifugal mechanism when swung slightly outward, the dotted lines indicating the complete outline of the working parts, this view being taken after the removal of the case containing the cyclometer mechanism. Fig. 7ᵃ is a detail view of the spring controlling the centrifugal weights. Fig. 8 is a top plan of this cyclometer mechanism, having a portion of the case broken away. Fig. 9 is a bottom plan of the same. Fig. 10 is a vertical section of the device on line 10 10 in Fig. 7, the containing-case, however, not being shown. Fig. 11 is a vertical section taken on line 11 11 in Fig. 7 and including a corresponding section of the cyclometer mechanism. Fig. 12 is a top plan of the cyclometer mechanism, illustrating its connections. Fig. 13 is a section on line 13 13 in Fig. 12, on a larger scale. Fig. 14 is a similar section on line 14 14 in Fig. 12. Fig. 15 is a horizontal section taken on line 15 15 in Fig. 13, the view including also the pinion which is shown in Fig. 12, but which does not appear in Fig. 13. Figs. 16, 17, and 18 are similar sections taken on lines 16 16, 17 17, and 18 18, respectively, in Fig. 13.

The cylindrical containing-case A is secured to and supported by a bracket B, which latter is of suitable size and construction to permit its attachment adjacent to the vehicle-wheel whose rotation is to serve as a medium for gaging the speed of the vehicle.

The wheel D, mounted on the shaft D', is arranged outside the containing-case A for the purpose of receiving a rotary motion from the vehicle-wheel.

The most satisfactory arrangement I find is to attach the bracket B to the axle of the vehicle-wheel and to provide a small wheel, rotating with the vehicle-wheel, with whose periphery the wheel D may be placed in contact.

In Figs. 1 and 2 the device is shown attached to the front wheel C of a bicycle, such wheel being provided with a small wheel desirably formed by an outwardly-extending flange $c'$. I do not confine myself, however, to such arrangement, for it is obvious that the wheel D could be supplied with a rotary connection with the vehicle-wheel in a number of ways. This wheel D, which is thus to be rotated by the vehicle-wheel, is arranged to transmit such rotation to the centrifugal mechanism and to the cyclometer mechanism. Of these mechanisms the former comprises one or more weights carried by swinging arms which are pivotally secured to a rotating support. In the construction illustrated (see Figs. 6, 7, and 10) the weights E are formed integral with the arms F, which latter are pivotally connected to the disk or plate G, as by the pivot $f$. This disk or plate is supported for rotary motion by securing it to the standard or shaft H, whose lower end $h$ fits into the socket or bearing $a$ in the case A. As a convenient arrangement a second plate or disk G' is provided, to which the upper ends of the shaft H and of the pivots $f$ are secured, the whole thus forming a neat and compact case containing a portion of the operating mechanism, which may be readily removed from the containing-case A when so desired. In order to insure a like movement on the part of each weight, a connector J is provided, which is pivoted upon the standard or shaft H and which has a sliding connection with the weights, the connection shown consisting of the pins or screws $e$, which are secured to the weights and which slide in the slots $j$ in the connector J. Obviously the movement of either weight will impart a corresponding movement to the other, and thus insure a perfect balance and equilibrium between the two should any tendency exist to cause an unequal movement thereof.

Owing to the fact that the centrifugal force becomes greater as the distance from the center of rotation increases it is desirable to provide means for preventing an abnormally great deflection of the arms F when they are swung outward during rotation. As one arrangement for accomplishing this result I have shown the springs K, which are secured at both ends and placed in such a position with reference to the swinging arms F that the outward movement of these arms will swing them against the springs, which will thus become tighter and less yielding as the outward swing of the arms increases. A convenient disposal of these springs is to secure one end to the pivot of its coöperating swinging arm and to secure the other end at a point in a line lying at an angle to the direction of the length of the arm when the latter is in its normal position of rest. In Fig. 7$^a$ the spring is shown composed of a single piece, which is bent around the pins $f$ and $f'$. The swinging arms are provided with coöperating stops K', having curved surfaces which come in contact with the springs and roll upon the same as the weights move outward. By such arrangement the resistance offered by the springs K is very slight at the initial movement of the weights, but increases as the latter move outward. Rotary motion is imparted to this centrifugal mechanism from the wheel D by any suitable means, the connection illustrated consisting of the gear-wheel $g$, mounted on the standard or shaft H, the bevel-gear $d$, mounted on the shaft D', and the intervening gears $d'$ and $d^2$, mounted on the shaft $D^2$. The shaft $D^2$ is supported by the lower side $a'$ of the case A and by the extension B' of the bracket B and is protected from injury by a suitable cover A'.

The outward and inward movement of the weights is communicated to a hand or pointer $R^2$, whose position over the dial Q indicates the rate of travel of the vehicle. For this purpose a wedge L, Fig. 10, is attached to one of the arms F and arranged to move therewith in such a manner that its inclined surface will reciprocate a moving part in a plane lying at right angles to the plane in which the arms swing, it being observed that the power of both weights is utilized by reason of the connector J. This wedge is conveniently arranged to move in a slot in the standard H, which forms a guideway therefor, and reciprocates the pin M, which slides longitudinally in said standard. Resting upon this pin is one arm of the bell-crank lever N, Figs. 9 and 11, whose other arm $n$ engages a prong $o$ on the sector O, Fig. 8. The teeth on the periphery of this sector mesh with the teeth of the wheel P, mounted on the shaft P', carrying the pointer or hand $P^2$. A spring O' engages a prong on the opposite side of the sector and tends to hold the latter in such a position that the hand or pointer points normally at zero on the dial. The parts are held in place by a bracket Q', secured to the under side of the dial Q. Obviously a given vertical movement of the pin M turns the sector O, and the latter swings the hand P² to a predetermined position.

The dial Q may be graduated in any suitable way, but as a preferred arrangement it is provided with figures, say, from "1" to "7," inclusive, as in Fig. 3, which indicate the number of minutes required to travel one mile at the speed at which the vehicle is then proceeding.

It is desirable to indicate in such an instrument the total number of miles traveled as well as the rate of progress at any particular instant. Consequently I arrange below the main dial a number of smaller dials, each provided with numerals from "0" to "9," inclusive, in such a manner that one numeral of each small dial will appear through apertures in the main dial, the numerals appearing in serial order and indicating the number of miles traveled in units, tens, hundreds, &c. A second pointer may also be provided which will indicate the fraction of a mile. In the arrangement I have chosen the hand or pointer T is placed so as to turn within the small circle T' to indicate tenths of a mile, and the three small dials S S' S² are situated below the main dial and interconnected so that the numerals of S will indicate units, of S' tens, and of S² hundreds. The connections are as follows: The shaft D' is provided with a wheel R, having the single tooth $r$, Fig. 4, which engages the teeth of the wheel R', whereby the latter is turned a fraction of a revolution, depending upon its number of teeth, at every rotation of the wheel D. The spur-wheel R³, rotating with the wheel R', engages in turn the spur-wheel R², which is situated in a plane lying substantially parallel to the dials S, S', and S². A pin or single tooth $r^2$ on wheel R² engages the teeth of wheel U, Fig. 15, which latter is rigid with the wheel U' and also with the spindle W. Wheel U' is provided with a single tooth $u'$, which engages the teeth on wheel V, Fig. 16, which are ten in number. Wheel V is rigid with its spindle W', and the latter carries the pointer T. The wheel U' rotates by previous calculation once every tenth of a mile during the advance of the vehicle, and therefore turns wheel V one-tenth of a revolution for every revolution of its own. This is indicated by the pointer or hand T upon the circle T'. Rigid with V is the single-toothed wheel V', Fig. 17, engaging with wheel $s^3$, also having ten teeth and being loose upon the spindle W, but rigid with the dial S. The wheel V', turning once every mile, turns wheel $s^3$, and therefore the dial S, once every ten miles. The numerals on this dial, then, appearing through the aperture X in dial Q, indicate single miles. In a similar manner the single-toothed wheel $s$, rigid with $s^3$, engages wheel $s'$, Fig. 18, which has ten teeth and which is loose upon spindle W', but rigid with dial S'. This dial therefore turns once every hundred miles, and its numerals, appearing through aperture X', indicate tens of miles. A single tooth on the dial S' engages the teeth, also ten, on dial S², Fig. 12, the result being that the latter turns once every thousand miles, and its numerals, appearing through aperture X², indicate hundreds of miles. The spindles upon which these dials are mounted are conveniently held in place by the disk or plate Y and the dial Q, the whole forming, when thus secured together, a secondary case which is capable of easy removal from the containing-case A. The disk Y, Fig. 11, rests upon a shoulder formed by the end of the standard H and is provided with an aperture through which the pin M may be thrust.

A suitable cover A², having a glass crystal, is desirably fitted upon the case A over the dial Q.

What I claim is—

1. In a speed-indicator, the combination with the movable member of the indicating device, of a rotary support; a swinging arm pivotally connected with the rotary support and carrying a weight near its free end, whereby the arm is swung about its pivotal connection with the rotary support during the rotation of the latter; means for exerting a tendency to oppose the outward swing of the arm; a wedge connected with the swinging arm and arranged for longitudinal movement in the plane of rotation in a direction substantially radial to the center thereof; and power-transmitting connection between the wedge and the movable member of the indicating device, whereby the latter is actuated by the longitudinal movement of the wedge, substantially as set forth.

2. In a speed-indicator, the combination with the rotary support, of a number of swinging arms pivotally connected thereto and carrying centrifugal weights near their free ends; a connector mounted to rotate with the rotary support and having a sliding connection with the swinging arms for causing an equal movement on the part of each arm; means for exerting a tendency to oppose the outward swing of the arms; a device mounted so as to be capable of movement in a direction substantially at right angles to the plane of rotation; and a wedge attached to one of the swinging arms for actuating such device, said wedge being arranged for longitudinal movement in a direction substantially radial to the center of the plane of rotation and being so situated as to move transversely to the direction of motion of the movable device, substantially as set forth.

3. Mechanism for transmitting the movement of a centrifugal weight to the indicating device of a speed-indicator, said mechanism comprising a device supported for suitable indicating movement at the center of rotation, and a wedge having a connection with the weight for actuating said central device, said wedge being arranged for longitudinal movement in the plane of rotation in a direction substantially radial to the center thereof, as set forth.

4. The combination, in a speed-indicator having a suitable dial and pointer, of a rotary support having pivotally secured thereto a number of swinging arms which are provided with centrifugal weights; one or more springs attached to the rotary support and adapted to oppose the tendency on the part of the weights to fly outward during rotation; a centrally-pivoted connector arranged to rotate with the rotary support and having a sliding connection with the swinging arms for causing an equal movement on the part of each of the same; a movable wedge connected with one of the swinging arms and arranged for longitudinal movement thereby; a movable pin supported at the center of rotation so as to be longitudinally reciprocated by the reciprocation of the wedge; a sector engaging a wheel with which the indicating-pointer is provided, and a spring to which the sector is subject; and a bell-crank lever engaging the sector and arranged to be actuated by the movable pin, substantially as described.

5. In a combined speed-indicator and cyclometer, the combination with a rotary member adapted to receive motion from the movement of the vehicle to which the device is attached, of a rotary support having a power-transmitting connection with said rotary member; a swinging arm pivotally connected to the rotary support and carrying a centrifugal weight near its free end; means for exerting a tendency to oppose the outward movement on the part of the arm; a wedge attached to the arm and arranged for longitudinal movement in the plane of rotation in a direction substantially radial to the center thereof; and cyclometer mechanism connected with, and actuated by the rotary member, substantially as set forth.

6. In a combined speed-indicator and cyclometer, the combination with a rotary member arranged to receive motion from the movement of the vehicle to which the device is attached, of a rotary support having a power-transmitting connection with said rotary member; a number of swinging arms pivotally connected with the rotary support and provided with centrifugal weights near their free ends; a connector mounted so as to rotate with the rotary support and having a sliding connection with the swinging arms for causing an equal movement on the part of each arm; one or more springs tending to oppose the outward swing of said arms; a wedge attached to one of said arms and arranged for movement in the plane of rotation in a direction substantially radial to the center thereof; and cyclometer mechanism connected with, and arranged to be actuated by, said rotary member, substantially as described.

7. In a pace-indicator, the combination with the weights supported for rotary motion, and connected for movement toward and away from the center of rotation, of the springs for resisting the tendency on the part of the weights to fly outward during rotation, said springs being secured at two points in their length and situated to receive the force of the weights at points between the points of attachment, substantially as set forth.

WILLIAM J. EDWARDS.

Witnesses:
RETA M. WAGNER,
A. F. DURAND.